United States Patent

[19]

Macks

[11] Patent Number: 5,945,745

[45] Date of Patent: Aug. 31, 1999

[54] ACTIVATION CONTROL FOR AN AUTOMOTIVE ELECTRONIC MODULE

[75] Inventor: Harold Ryan Macks, Detroit, Mich.

[73] Assignee: Ford Motor Company, Dearborn, Mich.

[21] Appl. No.: 09/085,609

[22] Filed: May 27, 1998

[51] Int. Cl.$^6$ ................................................. G06F 1/32
[52] U.S. Cl. ................ 307/10.1; 340/425.5; 364/707; 395/750.05
[58] Field of Search .................. 307/10.1, 9.1, 307/10.8; 304/707; 395/750.03, 750.08, 750.05; 340/425.5, 428; 455/343

[56] References Cited

U.S. PATENT DOCUMENTS

| 4,455,623 | 6/1984 | Wessemeyer et al. | 395/750.03 |
|---|---|---|---|
| 5,166,661 | 11/1992 | Chen | 340/425.5 |
| 5,196,728 | 3/1993 | Jaux | 307/10.1 |
| 5,216,674 | 6/1993 | Peter et al. | 371/29.5 |
| 5,229,942 | 7/1993 | Nicholson et al. | 364/424.03 |
| 5,249,298 | 9/1993 | Bolan et al. | 395/750 |
| 5,305,459 | 4/1994 | Rydel | 395/750.05 |
| 5,351,041 | 9/1994 | Ikata et al. | 455/343 |
| 5,485,625 | 1/1996 | Gumkowski | 395/800 |
| 5,620,236 | 4/1997 | McGrath et al. | 303/7 |
| 5,621,250 | 4/1997 | Kim | 307/10.1 |
| 5,669,004 | 9/1997 | Sellers | 395/750.06 |

Primary Examiner—Albert W. Paladini
Attorney, Agent, or Firm—Roger L. May; Mark A. Mollon

[57] ABSTRACT

A detector and battery switch control energy flow from a battery in a vehicle to an electronic module. The vehicle ignition switch controls battery energy flow when the ignition switch is on and the detector and battery switch control battery energy flow when the ignition switch is off. A dimming circuit provides a dimming signal when a demand for energy is made, such as when the headlights are turned on with the ignition switch turned off. The detector senses the dimming signal and operates a battery switch to power up a microprocessor controller from an unpowered state to control operation of the module when the demand for energy is made. There is no sleep mode. A response is made directly to the demand for energy and there is no battery power used until a demand is made for battery energy.

16 Claims, 3 Drawing Sheets

ACTIVATION CONTROL FOR AN AUTOMOTIVE ELECTRONIC MODULE

FIELD OF THE INVENTION

The present invention relates generally to automotive electronic control modules, and, more particularly, to an apparatus for powering a microprocessor controller on demand to control power distribution to an electronic module when the ignition is off.

BACKGROUND OF THE INVENTION

Automotive electrical systems provide a number of operating, safety and convenience functions using various control modules. These systems and control modules ultimately derive their electrical power from the vehicle battery. When the engine is not operating, the battery supplies power without simultaneously recharging thereby draining the battery making it ineffective to start the vehicle engine when required to do so. Many electronic modules have an inactive or sleep mode that reduces power consumption when the ignition is off.

FIG. 1 is an example of using a conventional wake up circuit to conserve battery energy by waking up a microprocessor controller from a sleep mode when a demand is made to power up a system to achieve a particular function. The control module (climate control, cluster, radio, etc.) is powered by the battery. Full operation is provided when ignition is detected by an ignition detector. When the signal from the ignition detector is removed, the module goes into a sleep mode where it draws a minimal amount of energy from the battery. While in the sleep mode, the microprocessor and communications module monitor for messages from other vehicle modules. One message that must be processed is a command to light the front panel of the dashboard display if the headlights are turned on when the ignition is off. Once the command is received the microprocessor exits the sleep mode and powers the display and bezel lighting to the proper level via a battery switch using a voltage regulator.

Due to the requirement to keep the battery energy drain as low as possible, the voltage regulator is costly in terms of dollar cost and energy consumption during the sleep mode. To minimize battery drain a low quiescent current voltage regulator is required which is expensive in terms of dollars compared to a standard voltage regulator. The microprocessor design is complicated by the need to have a sleep mode, and an additional pin is required to allow the battery power to be switched to the display/lighting circuit. In spite of an expensive voltage regulator and microprocessor, a finite amount of energy is required to allow the voltage regulator, microprocessor and communications module to operate to sense the incoming messages. This energy drain adds to the cost of the battery and the rest of the charging system requirements. Accordingly, it is desirable to power up when a demand for energy is made but to use minimal energy when the engine is off until a demand is made.

SUMMARY OF THE INVENTION

The present invention is directed to overcoming one or more of the problems set forth above. Briefly summarized, according to one aspect of the present invention, an apparatus for controlling energy flow from a battery in a vehicle to an electronic module wherein the vehicle has an ignition switch controlling battery energy flow when the ignition switch is on and the apparatus controls battery energy flow when the ignition switch is off includes a detector. The detector senses a demand signal indicative of a demand for energy flow to the electronic module when the ignition switch is open. When the signal is received, the detector operates a battery switcher to power up a microprocessor controller from an unpowered state to control operation of the electronic module when the demand for energy is made.

The detector includes a directional diode and a charging capacitor. The diode directs the demand signal towards the capacitor but prevents the capacitor from discharging towards the source of the demand signal. The capacitor responds to a changing amplitude demand signal to turn on a first transistor in the battery switcher which saturates and turns on a second transistor. The capacitor discharge path includes a resistor network that biases the first transistor and provides immunity to ground offset so that a dc ground offset present on the anode of the diode will not trigger the detector and provide a discharge path for first transistor when the demand signal is removed. When turned on, the second transistor saturates and switches battery power to power up the microprocessor controller. This allows the voltage regulator and controller to be unpowered and consume zero battery energy until a demand for the battery energy is made. Battery energy is thus conserved because the microprocessor controller, communications module and voltage regulator remain unpowered until a demand for battery energy is made.

Because the voltage regulator is not required to power the microprocessor controller during a sleep mode, a less expensive regulator can be used. It is less expensive because circuitry is not required to provide the low quiescent current required for a sleep mode. Because there is no sleep mode, the microprocessor controller does not require a connector pin for an ignition detector enabling a less complicated component to be used or freeing a connector pin for other uses.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
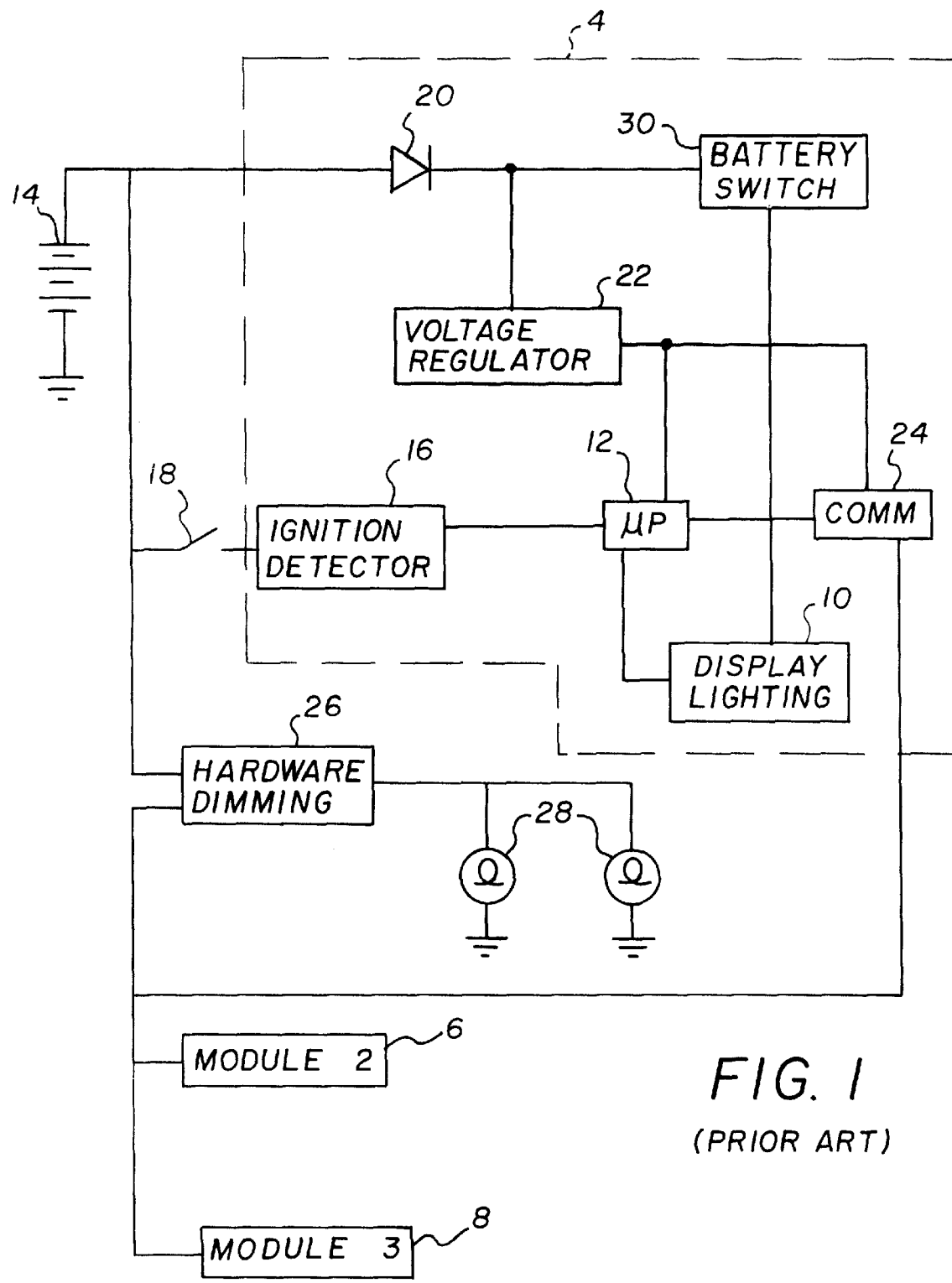
FIG. 1 is a prior art block diagram of wake up circuitry for an automotive electronic module.

FIG. 1 illustrates a conventional automotive system containing several electronic modules 4, 6, 8. Electronic module 4, shown in detail within the broken lines, contains a control module 10 (display lighting/climate control/cluster/radio/etc.) that is controlled by a microprocessor controller 12. The microprocessor controller 12 is powered via a vehicle battery 14. Full operation is provided when an ignition detector 16 senses closing of the ignition switch 18. Once ignition is removed by opening ignition switch 18, the controller 12 goes into a sleep mode where it draws a minimal amount of energy from the battery 14. In the sleep mode, energy from battery 14 flows through diode 20 and 5 V voltage regulator 22 to controller 12 and communications module 24. While in the sleep mode, the controller 12 and communications module 24 monitor for messages from other modules in the vehicle. One message that must be processed is a command to operate the display lighting 10 if the headlights are turned on in the absence of ignition. Turning on the headlights activates a hardwire dimming circuit 26 which lights bulbs 28 using a pulse width modulated (PWM) signal. The dimming module simultaneously sends out a command via a vehicle communications network to request the non-incandescent lighting to be activated. Once the command is received, the controller exits the sleep mode and powers the display and bezel lighting to the proper level via a battery switch 30.

Figure 2:
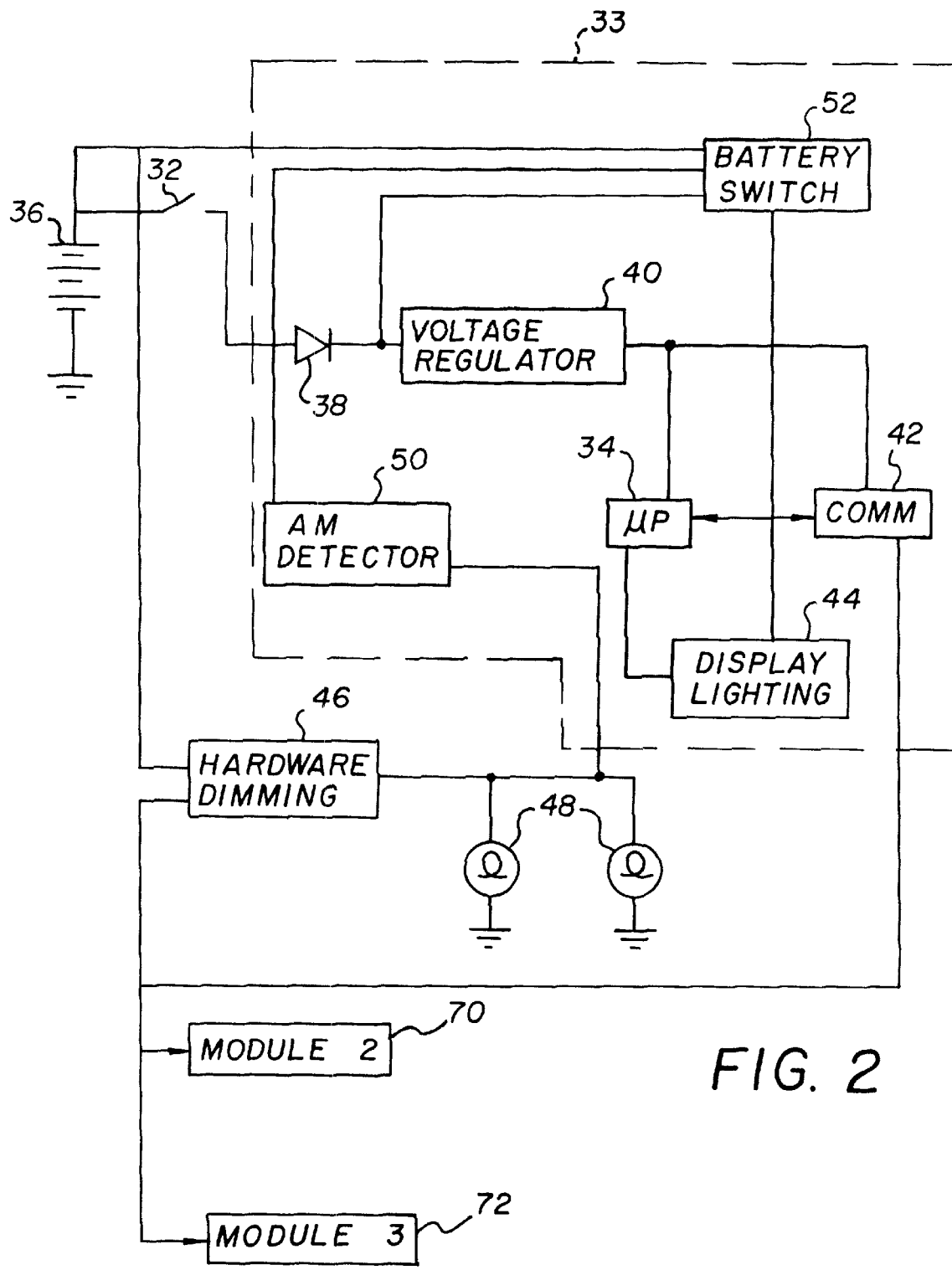
FIG. 2 is a block diagram of a preferred embodiment of battery switching and control circuitry for conserving battery energy until battery energy is demanded according to the present invention.
Figure 3:
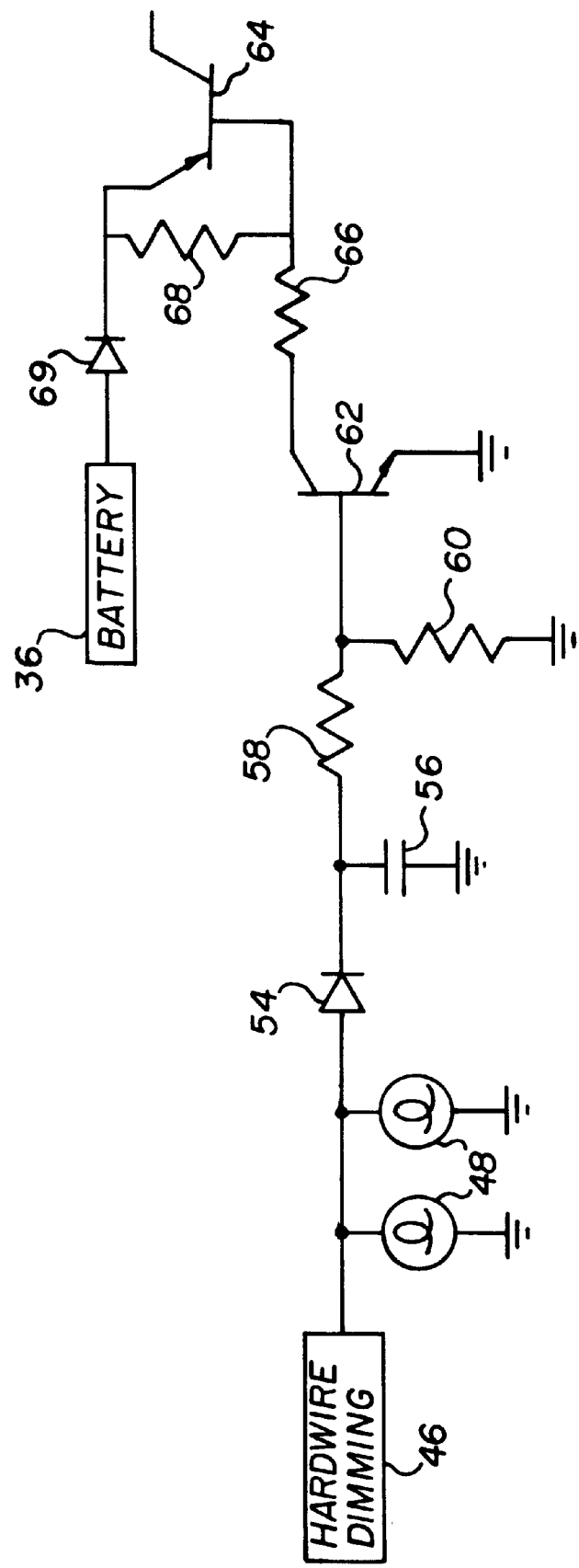
FIG. 3 is schematic diagram of a portion of the circuitry of FIG. 2 for detecting a dimming signal and switching battery power.

Referring to FIGS. 2–3, the present invention improves the conventional system by consuming less battery energy when the ignition is off by not having a sleep mode which allows the use of a less expensive voltage regulator and microprocessor. The voltage regulator and microprocessor have lower dollar costs because they are not required to have special circuitry for low quiescent current operation in a sleep mode. There is no low power sleep mode. There is no energy cost except at full operation.

When ignition switch 32 is closed, the microprocessor controller 34 in electronic module 33 (shown within the broken line boundary) receives energy from the battery 36 via diode 38 and voltage regulator 40. Communications module 42 also receives energy from the battery 36 via diode 38 and voltage regulator 40. Once ignition is removed, controller 34 is unpowered and therefore draws zero energy from the battery. Instead of having the 5 v regulator 40, controller 34 and communications module 42 powered to detect a request to light the display lighting 44, the presence of the hardwired dimming signal from circuit 46 is detected to power up controller 34 to operate display lighting 44 when the headlights are turned on. The dimming signal from dimming circuit 46 is required to support incandescent lighting 48 which is often combined with displays and LED back lighting. The dimming signal is preferably a 100 Hz, open circuit to battery with a 10% to 90% duty cycle.

Once the dimming signal is present after ignition is removed, an amplitude modulation (AM) detector 50 senses the dimming signal and activates a battery switcher 52. The battery switch 52 applies power to internal ignition circuits (anode of diode 69) allowing the controller to power up and receive communications required to control display lighting and all other vehicle modules.

The AM detector includes a diode 54 with its anode connected to the dimming circuit 46 to receive the dimming signal. A charging capacitor 56 has one terminal connected to the cathode of diode 54 and has its other terminal grounded. A voltage divider is formed of first and second resistors 58, 60 connected at a junction with resistor 58 having its other end connected to the cathode diode 54 and to capacitor 56, and with resistor 60 having its other end grounded. The voltage divider provides a bias signal at the junction for controlling operation of the battery switch 52.

The battery switch 52 includes a first transistor 62 that receives a bias signal from the junction at its base and delivers an output signal at its collector when the magnitude of the bias signal from the junction exceeds a predetermined threshold level. Resistor 60 provides a current path to ground to prevent transistor 62 from turning on if a dc voltage is present at the anode of diode 54 or if leakage current exists from the collector to base of transistor 62. The output signal is delivered to the base of a second transistor 64 through resistor 66. Resistor 68 has one end connected to the base of transistor 64 and its other end connected to the emitter and is intended to keep transistor 64 from turning on unintentionally from leakage current existing from the base to collector of transistor 64. The battery 36 is connected to the emitter through diode 69. The second transistor receives the output signal from the first transistor and allows energy to flow from the battery through the second transistor to power up the voltage regulator and microprocessor from an unpowered state to control operation of the modules. Transistors 62 and 64 operate saturated acting as switches.

Once the dimming signal is present, capacitor 56 charges. Diode 54 prevents the instantaneous discharge of capacitor 56 through the incandescent load 48. With capacitor 56 charged, the base-emitter junction of transistor 62 becomes forward biased placing transistor 62 into saturation. Resistors 58 and 60 insure that a dc ground offset will not trigger AM detector 50 and provide a discharge path for transistor 62 when the dimming signal is removed. With transistor 62 saturated, transistor 64 will also saturate allowing the battery to be switched to the internal ignition circuit thereby allowing the voltage regulator and microprocessor controller to power up and process communication messages.

It will be now appreciated that there has been presented an apparatus for controlling energy flow from a battery in a vehicle to an electronic module that draws no battery energy until a demand for battery energy is made. A detector and battery switch control energy flow from a battery in a vehicle to an electronic module such as a display lighting module. The vehicle ignition switch controls battery energy flow when the ignition switch is on and the detector and battery switch control battery energy flow when the ignition switch is off. A dimming circuit provides a dimming signal for incandescent bulbs and a communication message for non-incandescent lighting when a demand for lighting is made, such as when the headlights are turned on with the ignition switch turned off. The dimming signal is usually a 100 Hz, open circuit to battery signal with a 10% to 90% duty cycle. The detector senses the dimming signal and responds to its changing amplitude to operate a battery switch to power up a microprocessor controller from an unpowered state to receive messages via the communication module control operation of the display and other lighting mechanisms not directly connected to the dimming signal when the demand is made. There is no sleep mode. A response is made directly to the demand for lighting and there is no battery power used until a demand is made for lighting.

While the invention has been described with reference to an electronic module 33 for controlling lighting, other modules 70, 72 can be provided for climate control, instrument cluster, radio, and other systems and controls.

While the invention has been described with reference to a dimming circuit providing a dimming signal, the invention can be combined with other devices that produce a signal, but the dimming signal is preferred because it is now always available. As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An apparatus for controlling energy flow from a battery in a vehicle to an electronic module, said vehicle having an ignition switch for controlling battery energy flow when the ignition switch is on, said apparatus controlling battery energy flow when the ignition switch is off, said apparatus comprising:

a battery switch for controlling energy flow from said battery;

circuit means for generating a demand signal indicative of a demand for energy to flow to said electronic module;

detector means for detecting said demand signal and delivering a signal to said battery switch in response to detecting said demand signal;

a microprocessor controller receiving battery energy through said battery switch in response to said battery switch receiving said signal from said detector means to power up from an unpowered state to thereby control operation of said electronic module.

2. An apparatus, as set forth in claim 1, wherein said detector means includes:

a diode having an anode and cathode, said anode receiving said demand signal;

a capacitor having one terminal connected to said cathode of said diode and having its other terminal grounded; and a voltage divider having first and second connected resistors connected at a junction, said first resistor having one end connected to said cathode of said diode, said second resistor being grounded, said voltage divider providing a bias signal at said junction for controlling operation of said battery switch.

3. An apparatus, as set forth in claim 2, wherein said diode and said capacitor respond to amplitude modulation of said demand signal.

4. An apparatus, as set forth in claim 2, wherein said demand signal is an amplitude modulated signal.

5. An apparatus, as set forth in claim 2, wherein said battery switch includes:

a first transistor receiving said bias signal from said junction and delivering an output signal when the magnitude of said bias signal from said junction exceeds a predetermined threshold level; and a second transistor receiving said output signal from said first transistor and allowing energy to flow from said battery through said second transistor to power up said microprocessor from an unpowered state to control energy flow to said electronic module.

6. An apparatus, as set forth in claim 2, wherein said diode and said capacitor respond to amplitude modulation of said demand signal to produce a bias signal.

7. An apparatus for a vehicle, comprising:

an ignition switch;

a battery switch for controlling energy flow from a battery;

means for generating a demand signal indicative of a demand for energy to flow to an electronic module;

a dimming circuit providing a dimming signal in response to receiving said demand signal;

detector means for detecting said dimming signal from said dimming circuit, said detector means operating said battery switch in response to detecting said dimming signal; and a microprocessor controller receiving battery energy through said battery switch when said battery switch operates to power up from an unpowered state to thereby control operation of said electronic module.

8. An apparatus, as set forth in claim 7, wherein said detector means includes:

a diode having an anode and cathode, said anode receiving said dimming signal;

a capacitor having one terminal connected to said cathode of said diode and having its other terminal grounded; and a voltage divider having first and second connected resistors connected at a junction, said first resistor having one end connected to said cathode of said diode, said second resistor being grounded, said voltage divider providing a bias signal at said junction for controlling operation of said battery switch.

9. An apparatus, as set forth in claim 8, wherein said battery switch includes:

a first transistor receiving said bias voltage signal from said junction and delivering an output signal when the magnitude of said bias signal from said junction exceeds a predetermined threshold level; and a second transistor receiving said output signal from said first transistor and allowing energy to flow from said battery through said second transistor to power up said microprocessor from an unpowered state to control operation of lighting of said module.

10. An apparatus, as set forth in claim 8, wherein said diode and said capacitor respond to amplitude modulation of said dimming signal.

11. An apparatus, as set forth in claim 8, wherein said dimming signal is an amplitude modulated signal.

12. An apparatus, as set forth in claim 8, wherein said diode and said capacitor respond to changes in amplitude of said dimming signal to produce a modulation bias signal.

13. An apparatus for controlling energy flow from a battery in a vehicle to an electronic module, said vehicle having an ignition switch for controlling battery energy flow when the ignition switch is on, said apparatus controlling battery energy flow when the ignition switch is off, said apparatus comprising:

circuit means for generating a demand signal indicative of a demand for energy to flow to said electronic module;

detector means for detecting said demand signal, said detector means including a diode having an anode connected to receive said demand signal, a capacitor having one terminal connected to a cathode of said diode and another terminal grounded, and a voltage divider having first and second connected resistors connected at a junction with said first resistor having one end connected to said cathode of said diode and said second resistor being grounded so that said voltage divider provides a bias signal at said junction;

a battery switch including a first transistor receiving said bias signal from said junction and delivering an output signal when the magnitude of said bias signal from said junction exceeds a predetermined threshold level, and a second transistor receiving said output signal from said first transistor and allowing energy to flow from said battery through said second transistor to power up said electronic module;

a microprocessor controller receiving battery energy through said battery switch to power up from an unpowered state to thereby control operation of said electronic module.

14. An apparatus, as set forth in claim 13, wherein said diode and said capacitor respond to amplitude modulation of said demand signal.

15. An apparatus, as set forth in claim 13, wherein said demand signal is an amplitude modulated signal.

16. An apparatus, as set forth in claim 13, wherein said diode and said capacitor respond to changes in amplitude of said demand signal to produce a modulation bias signal.

* * * * *